United States Patent
McAnulty

(10) Patent No.: US 7,637,053 B1
(45) Date of Patent: Dec. 29, 2009

(54) CROP PROTECTION DEVICE

(76) Inventor: James W. McAnulty, 44128 Fenhold St., Lancaster, CA (US) 93535

( * ) Notice: Subject to any disclaimer, the term of this patent is extended or adjusted under 35 U.S.C. 154(b) by 104 days.

(21) Appl. No.: 11/940,608

(22) Filed: Nov. 15, 2007

(51) Int. Cl.
*A01G 13/04* (2006.01)
(52) U.S. Cl. .................. 47/23.1; 47/23.3; 47/29.4
(58) Field of Classification Search ............. 47/1.01 R, 47/2, 17, 20.11, 23.1–23.3, 29.1–29.4, 29.6, 47/31
See application file for complete search history.

(56) References Cited

U.S. PATENT DOCUMENTS

| | | | | |
|---|---|---|---|---|
| 558,346 | A * | 4/1896 | Boyd | 47/29.6 |
| 1,126,426 | A * | 1/1915 | Eddy | 47/23.2 |
| 1,351,249 | A * | 8/1920 | Honstedt | 47/23.2 |
| 1,363,720 | A * | 12/1920 | Cooper | 239/536 |
| 1,446,416 | A * | 2/1923 | Curtiss | 47/23.2 |
| 1,600,749 | A * | 9/1926 | Barnes | 47/23.2 |
| 2,006,562 | A * | 7/1935 | Scheu | 47/2 |
| 2,889,664 | A * | 6/1959 | Olshansky | 47/29.1 |
| 2,963,819 | A * | 12/1960 | Hoch | 47/17 |
| 3,698,131 | A | 10/1972 | Kesinger | |
| 3,964,465 | A | 6/1976 | Diggs | |
| 4,763,440 | A | 8/1988 | James | |
| 4,901,472 | A | 2/1990 | Donohue et al. | |
| 5,179,798 | A * | 1/1993 | Sonagere | 47/29.1 |
| 5,305,548 | A | 4/1994 | Siebol | |
| D441,044 | S | 4/2001 | Dalland | |
| 6,796,083 | B2 * | 9/2004 | Hadar | 47/31 |
| 6,810,618 | B1 | 11/2004 | Hauser | |
| 2003/0182851 | A1 | 10/2003 | Lin | |

* cited by examiner

*Primary Examiner*—Rob Swiatek
*Assistant Examiner*—Danielle Bates
(74) *Attorney, Agent, or Firm*—Crossley Patent Law; Mark A. Crossley

(57) ABSTRACT

A crop protection device that is designed to cover a number of citrus fruit trees during periods of cold weather. The device is a heated canopy system that is made from a lightweight, high strength fabric that is supported by a number of ground-mounted frame members. The ends of the fabric are attached to one another by a drawstring, which is wound through a series of eyelets on the fabric. The device also includes a heater and blower unit that continuously blows hot air within the confines of the fabric after the fabric has been mounted over at least one citrus plant.

2 Claims, 4 Drawing Sheets

CROP PROTECTION DEVICE

BACKGROUND OF THE INVENTION

The present invention concerns that of a new and improved crop protection device that is designed to cover a number of citrus fruit trees during periods of cold weather.

SUMMARY OF THE INVENTION

The present invention concerns that of a new and improved crop protection device that is designed to cover a number of citrus fruit trees during periods of cold weather. The device is a heated canopy system that is made from a lightweight, high strength fabric that is supported by a number of ground-mounted frame members. The ends of the fabric are attached to one another by a drawstring, which is wound through a series of eyelets on the fabric. The device also includes a heater and blower unit that continuously blows hot air within the confines of the fabric after the fabric has been mounted over at least one citrus plant.

There has thus been outlined, rather broadly, the more important features of a crop protection device that the detailed description thereof that follows may be better understood and in order that the present contribution to the art may be better appreciated. There are, of course, additional features of the crop protection device that will be described hereinafter and which will form the subject matter of the claims appended hereto.

In this respect, before explaining at least one embodiment of the crop protection device in detail, it is to be understood that the crop protection device is not limited in its application to the details of construction and to the arrangements of the components set forth in the following description or illustrated in the drawings. The crop protection device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the crop protection device. It is important, therefore, that the claims be regarded as including such equivalent constructions insofar as they do not depart from the spirit and scope of the present invention.

It is therefore an object of the present invention to provide a crop protection device which has all of the advantages of the prior art and none of the disadvantages.

It is another object of the present invention to provide a crop protection device which may be easily and efficiently manufactured and marketed.

It is another object of the present invention to provide a crop protection device which is of durable and reliable construction.

It is yet another object of the present invention to provide a crop protection device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
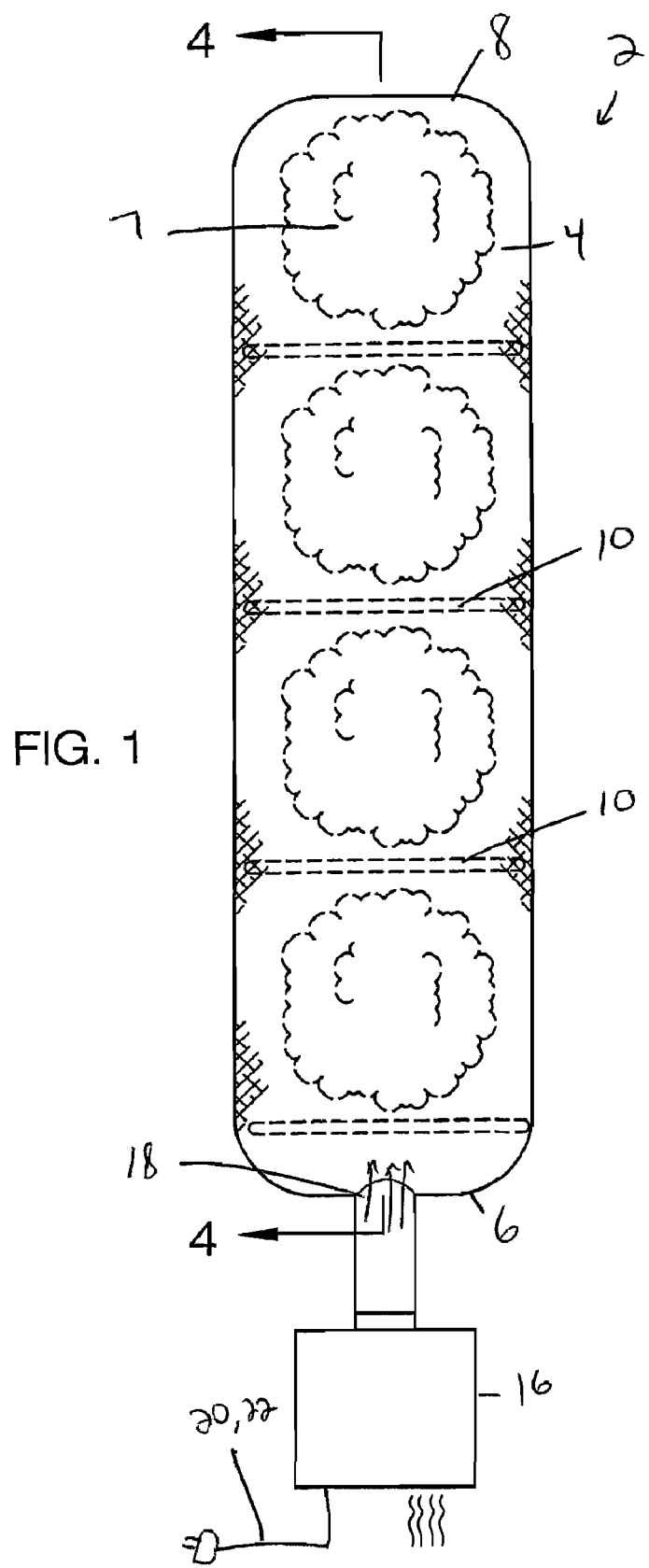
FIG. 1 shows a top view of the crop protection device as it would appear fully assembled and in use.
Figure 5:
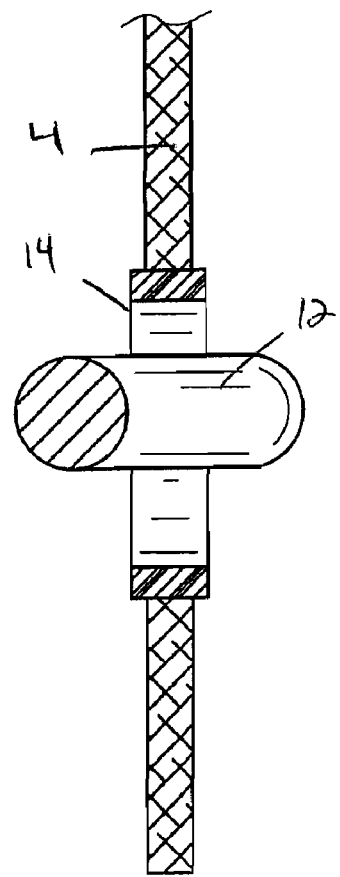
FIG. 5 shows a perspective view of the drawstring, highlighting how the drawstring is attached to the fabric material via an eyelet.
Figure 2:
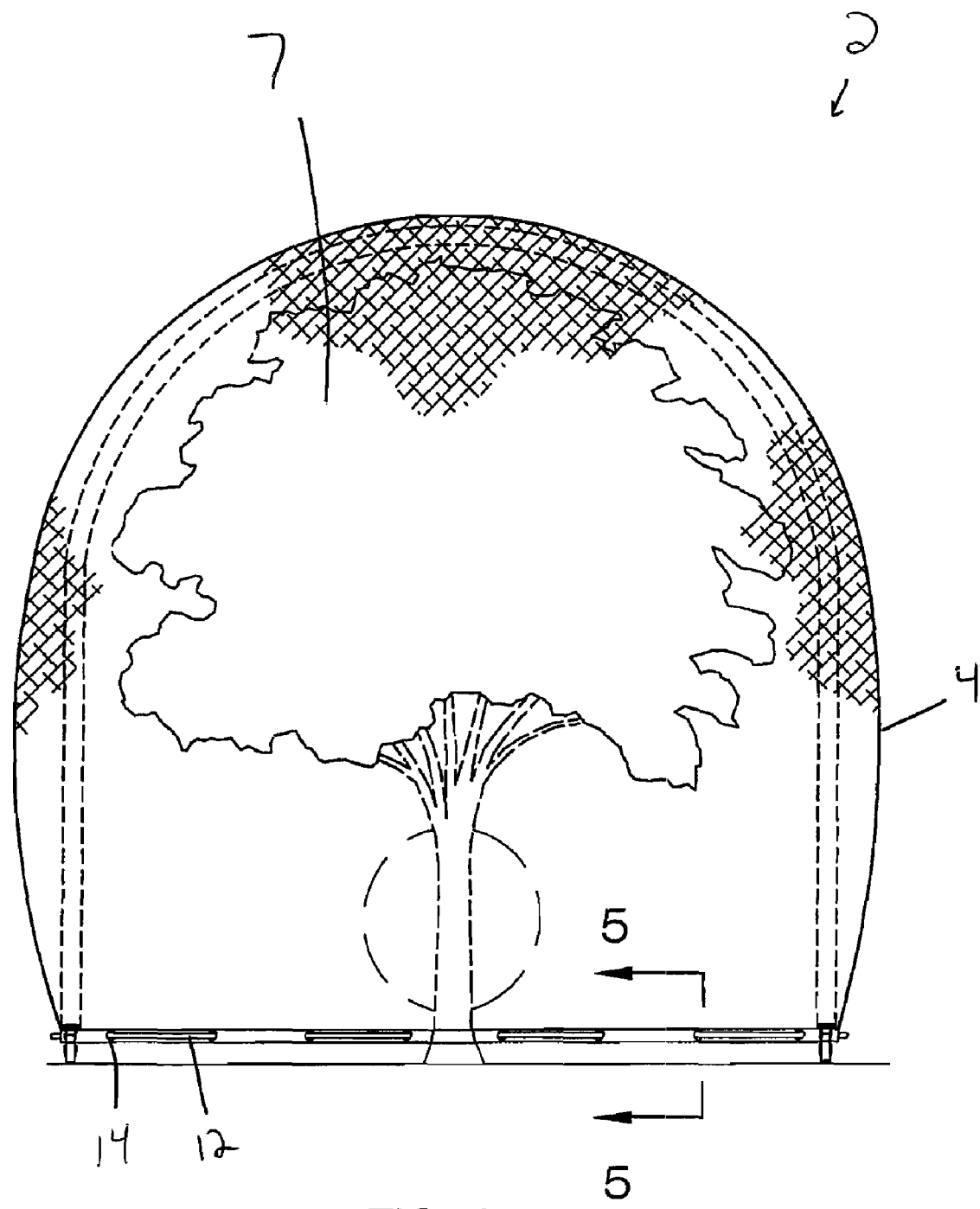
FIG. 2 shows a perspective view of the crop protective device as it would appear mounted over a single tree.

With reference now to the drawings, and in particular to FIGS. 1 through 5 thereof, a new crop protection device embodying the principles and concepts of the present invention and generally designated by the reference numeral 2 will be described.

As best illustrated in FIGS. 1 through 5, the crop protection device 2 comprises a sheet of fabric material 4 that has two ends comprising a first end 6 and a second end 8. The fabric material 4 has a half-cylindrical shape to allow it to properly envelop one or more citrus plants 7. The fabric material 4 can be a wide variety of materials, but preferably is fabricated from a material that is lightweight and high-strength. The preferable material used to fabricate the fabric material 4 is nylon, although other, similar materials can be used to fabricate the fabric material 4.

The device 2 also includes a series of frame members 10. Generally, the device 2 works most efficiently with either one citrus plant 7, or if more than one citrus plant 7 is protected with a particular crop protection device 2, a number of citrus plants 7 that are all located within a linear row. Prior to installation of the fabric material 4, a frame member 10 is placed on either side of the citrus plant (or plants) to be protected.

Figure 3:
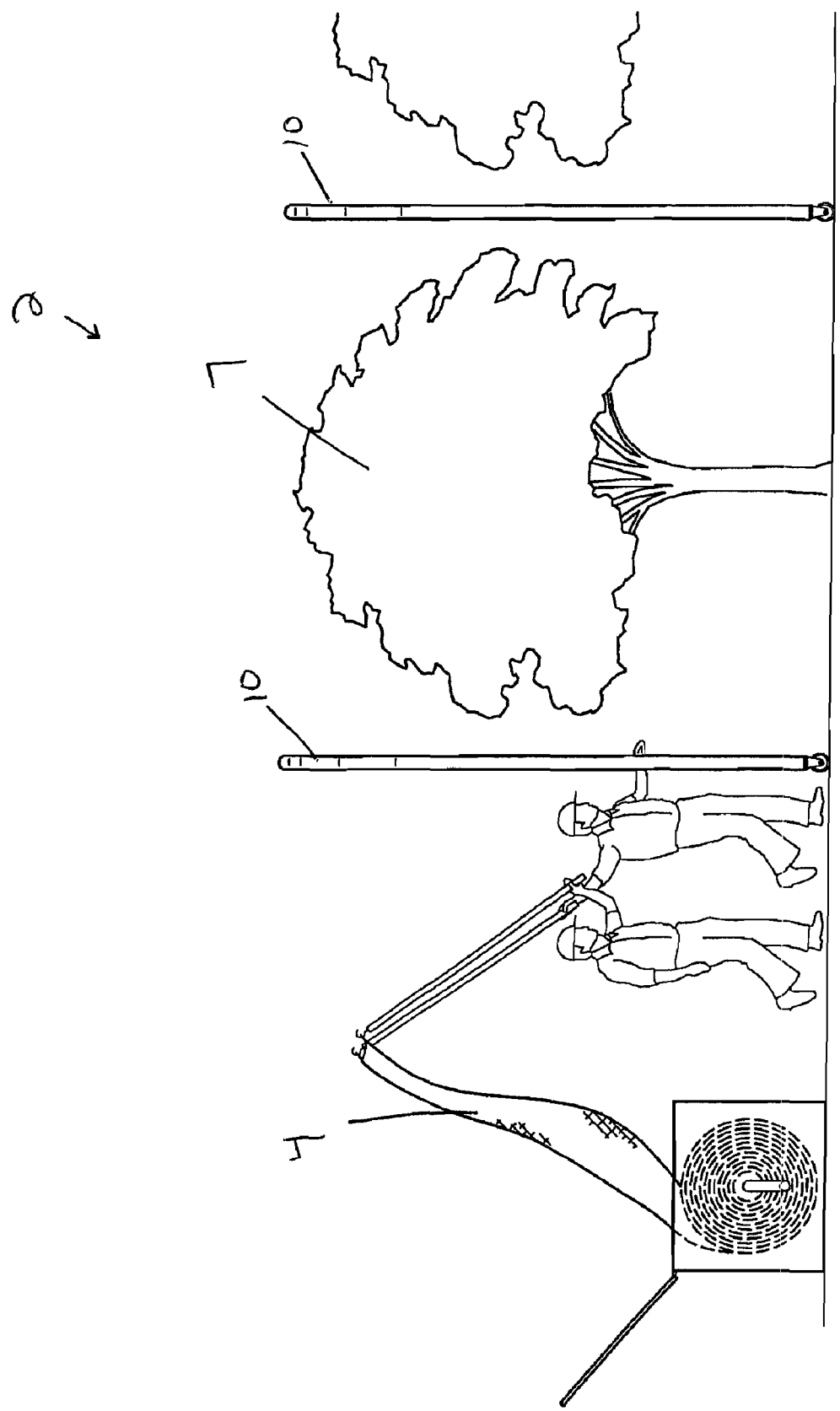
FIG. 3 shows the crop protection device in the process of a series of workers mounting the crop protection device over a tree.
Figure 4:
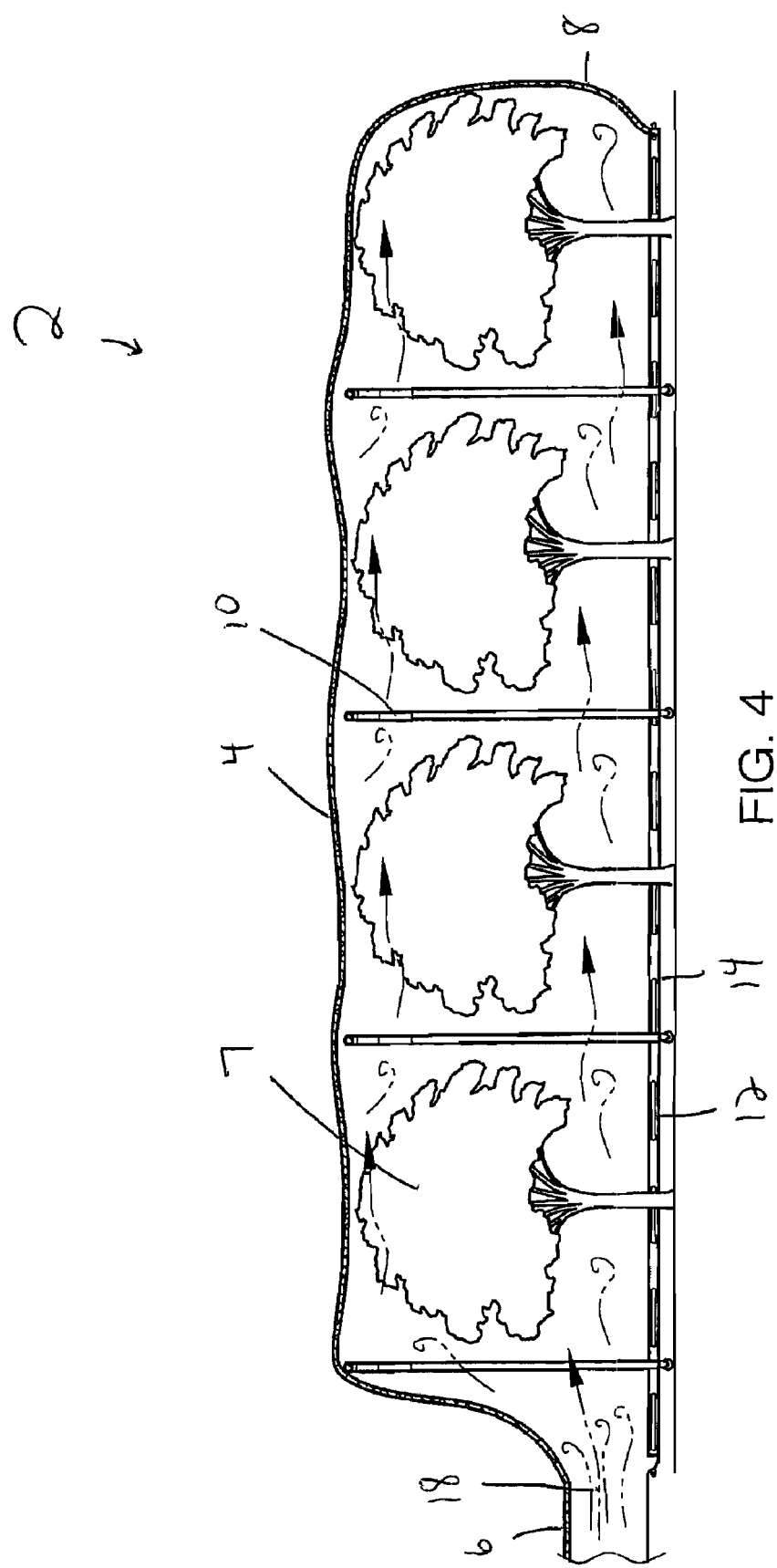
FIG. 4 shows a side view of the crop protection device as it would appear fully assembled and in use.

In order to determine the number of frame members 10 needed for a particular application of the crop protection device 2, the formula (n+1) can generally be used, with the variable n denoting the number of citrus plants that are designed to be protected with the particular application of the crop protection device 2. As an example, FIG. 3 shows one citrus plant 7 (n=1) and therefore, (1+1)=2 frame members 10 that are needed in this particular instance.

Once the fabric material 4 has been placed over a series of frame members 10, the first end 6 and the second end 8 of the frame material 4 need to be attached to one another so that wind or other inclement weather will not cause the fabric material 4 to become displaced. Therefore, a drawstring 12 is inserted through a series of eyelets 14 that are located on the first end 6 and the second end 8. Furthermore, the eyelets 14 are also located along the sides of the fabric material 4, with the drawstring being inserted through these eyelets 14 as well.

The second end 8 of the fabric material 4 is closed. However, the first end 6 of the fabric material 4 has a heater and blower unit 16 that continuously blows hot air 18 into the area covered by the fabric material 4. Heater and blower unit 16 is preferably powered by power means 20, which preferably is standard household current 22.

With respect to the above description then, it is to be realized that the optimum dimensional relationships for the parts of the present vehicle air freshener device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A crop protection device comprising
   (a) a sheet of fabric material having two ends, said two ends comprising a first end and a second end, the sheet of fabric material having a half-cylindrical shape,
   (b) at least one plant that needs to be protected by the crop protection device, said plant comprising a citrus plant,
   (c) means for mounting the sheet of fabric material over the plant, said means further comprising (i) a plurality of frame members, wherein a frame member is placed on either side of a plant to be protected by the crop protection device, (ii) means for securing the sheet of fabric material to the plurality of frame members, said means further comprising (1) a plurality of eyelets interspersed throughout the sheet of fabric, and (2) a drawstring that is inserted through each of the eyelets of the plurality of eyelets, wherein the actual number of frame members used with a particular application of the crop protection device comprises a number equal to one higher than the number of plants to be protected with said application, and
   (d) means for providing heat to within the area located underneath the sheet of fabric material after the sheet of fabric material has been secured to the plurality of frame members, said means further comprising (i) a heater and blower unit attached to the first end of the sheet of fabric material, wherein the heater and blower unit continuously blows hot air into the area underneath the sheet of fabric material after the sheet of fabric material has been secured to the plurality of frame members, and (ii) power means for providing power to the heater and blower unit, said power means comprising standard household current.

2. A crop protection device according to claim 1 wherein the sheet of fabric material further comprises nylon.

\* \* \* \* \*